United States Patent
Tsai et al.

(10) Patent No.: US 10,364,103 B2
(45) Date of Patent: Jul. 30, 2019

(54) CONVEYOR SYSTEMS AND METHODS OF CONTROLLING MOVING STAGE

(71) Applicant: Delta Electronics, Inc., Taoyuan (TW)

(72) Inventors: Ching-Hsiung Tsai, Taoyuan (TW); Chieh-Huang Lu, Taoyuan (TW); Chi-Wen Chung, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/974,100

(22) Filed: May 8, 2018

(65) Prior Publication Data
US 2019/0062066 A1 Feb. 28, 2019

(30) Foreign Application Priority Data
Aug. 28, 2017 (CN) .......................... 2017 1 0751800

(51) Int. Cl.
*B65G 43/00* (2006.01)
*B65G 54/02* (2006.01)

(52) U.S. Cl.
CPC ............ *B65G 43/00* (2013.01); *B65G 54/02* (2013.01); *B65G 2203/0266* (2013.01); *B65G 2203/043* (2013.01); *B65G 2203/044* (2013.01); *B65G 2811/09* (2013.01)

(58) Field of Classification Search
CPC ............. B65G 43/00; B65G 2203/043; B65G 2203/044; B65G 2203/0266; B65G 2811/09; B65G 54/02
USPC ........................................................ 198/619
See application file for complete search history.

(56) References Cited

U.S. PATENT DOCUMENTS

| 5,047,676 A | * | 9/1991 | Ichikawa | ................. B23Q 1/58 310/12.19 |
|---|---|---|---|---|
| 5,156,093 A | * | 10/1992 | Azukizawa | ............. B60L 13/08 104/130.02 |
| 6,191,507 B1 | * | 2/2001 | Peltier | .................... B65G 54/02 310/12.02 |
| 9,239,335 B2 | * | 1/2016 | Heise | ..................... B65G 54/02 |
| 9,248,982 B2 | * | 2/2016 | Eberhardt | ............. G01N 35/04 |

(Continued)

FOREIGN PATENT DOCUMENTS

| JP | 63066025 A | * | 3/1988 |
|---|---|---|---|
| JP | 06209556 A | | 7/1994 |

(Continued)

*Primary Examiner* — Mark A Deuble
(74) *Attorney, Agent, or Firm* — Muncy, Geissler, Olds & Lowe, P.C.

(57) ABSTRACT

A conveyor system includes a moving stage, a track, a control circuit and a driver. The moving stage has a plurality of magnets and an optical scale. The track carries the moving stage and includes a first work area provided with a plurality of Hall sensor modules and a second work area provided with the Hall sensor modules and a read head module. When the moving stage is in the first work area, the Hall sensor module generates a first sensing signal. When the moving stage is in the second work area, the Hall sensor module generates the first sensing signal and the read head module generates a second sensing signal. The control circuit determines the position of the moving stage based on the first sensing signal and the second sensing signal, and generates a driving signal. The driver drives the coil windings according to the driving signal.

14 Claims, 7 Drawing Sheets

(56) References Cited

U.S. PATENT DOCUMENTS

| | | | | |
|---|---|---|---|---|
| 2003/0230941 A1* | 12/2003 | Jacobs | .................... | B60L 15/38 |
| | | | | 310/12.19 |
| 2014/0142792 A1* | 5/2014 | Hanaka | ................ | B61L 25/026 |
| | | | | 701/19 |
| 2014/0257554 A1* | 9/2014 | Takagi | ................... | H02P 25/06 |
| | | | | 700/229 |
| 2016/0194157 A1* | 7/2016 | Senn | ...................... | B65G 35/06 |
| | | | | 414/467 |
| 2018/0076069 A1* | 3/2018 | Burkhard | ............ | B29C 49/4205 |
| 2018/0079605 A1* | 3/2018 | Koga | ...................... | B61B 13/00 |

FOREIGN PATENT DOCUMENTS

| | | |
|---|---|---|
| JP | 07007911 A | 1/1995 |
| TW | 200934710 A | 8/2009 |
| TW | 201242871 A | 11/2012 |

* cited by examiner

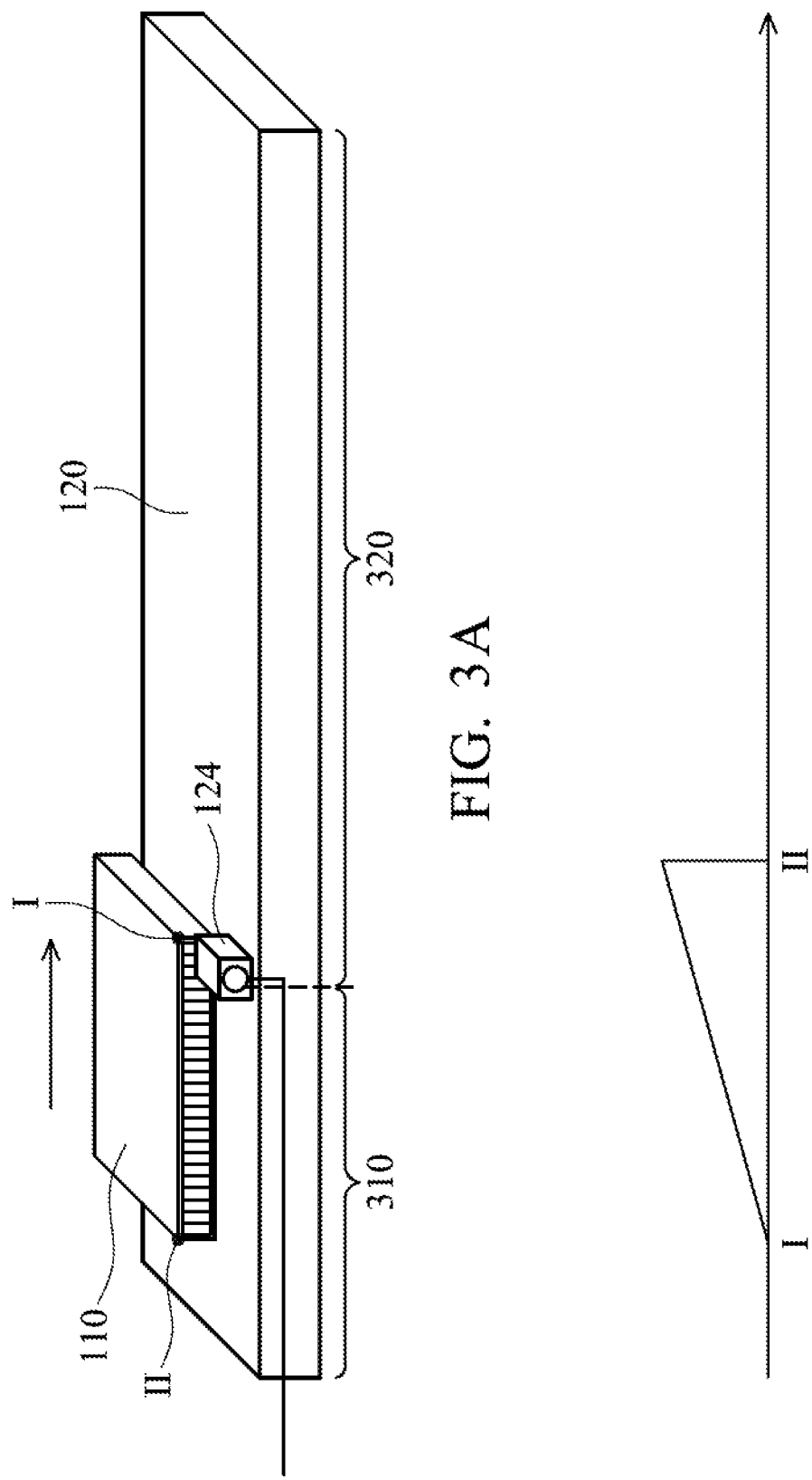

CONVEYOR SYSTEMS AND METHODS OF CONTROLLING MOVING STAGE

CROSS REFERENCE TO RELATED APPLICATIONS

This Application claims priority of Chinese Patent Application No. 201710751800.0, filed on Aug. 28, 2017, the entirety of which is incorporated by reference herein.

BACKGROUND OF THE INVENTION

Field of the Invention

The application relates in general to a conveyor system, and in particular to a conveyor system having at least one precision machining area and a non-precision machining area.

Description of the Related Art

Under the demands of Industry 4.0, and compared with the rotating machine, a linear motor has the characteristics of linear motion and can be directly driven, which means that it can be applied in a conveyor system. However, since existing constant-speed conveyor systems have low accuracy, when a precision machining process needs to be performed, it is necessary to move the products to another work area outside the production line, which will increase manufacturing costs and reduce the efficiency of the production line. In addition, since the movement of the moving stage of the current active conveyor system is limited by the wire, the wire configuration is more complex and its positioning is also less accurate, and it is not suitable for directly performing a precision machining process in the production line. Therefore, how to improve the positioning accuracy of an active conveyor system and simplify the procedure of the precision machining process is a problem that needs to be solved immediately.

BRIEF SUMMARY OF INVENTION

An embodiment of the present invention provides a conveyor system, including a moving stage, a track, a control circuit and a driver. The moving stage is provided with a plurality of magnets and an optical scale. The track has a plurality of coil windings and is configured to carry the moving stage. The moving stage further includes a first work area and a second work area. The first work area is provided with a plurality of sets of Hall sensor modules. The second work area is provided with Hall sensor modules and a read head module. When the moving stage is in the first work area, the Hall sensor module generates a first sensing signal by sensing the magnets. When the moving stage is in the second work area, the Hall sensor module generates the first sensing signal by sensing the magnets and the read head module generates a second sensing signal by sensing the optical scale. The control circuit determines the position of the moving stage according to the first sensing signal and the second sensing signal, controls the energization of the coil windings and generates a driving signal according to the position. The driver drives the coil windings according to the driving signal.

Another embodiment of the present invention provides a method of controlling a moving stage, adapted to a conveyor system having at least one moving stage, a track, a control circuit and a driver, wherein the moving stage is provided with a plurality of magnets and an optical scale. The method comprises the following steps: one of the Hall sensor modules generates a first sensing signal by sensing the magnets when the moving stage is in a first work area of the track; the Hall sensor modules generate the first sensing signal by sensing the magnets, and a read head module generates a second sensing signal by sensing the optical scale when the moving stage is in a second work area of the track; a control circuit determines the position of the moving stage according to the first sensing signal and the second sensing signal; the control circuit generates a driving signal according to the position; and a driver drives the coil windings provided on the track according to the driving signal for carrying the moving stage.

BRIEF DESCRIPTION OF DRAWINGS

The invention can be more fully understood by reading the subsequent detailed description and examples with references made to the accompanying drawings, wherein:

FIGS. 3A and 3B are schematic diagrams of a head module having only one read head in accordance with an embodiment of the present invention.

DETAILED DESCRIPTION OF INVENTION

Further areas to which the present conveyor systems and methods of controlling a moving stage can be applied will become apparent from the detailed description provided herein. It should be understood that the detailed description and specific examples, while indicating exemplary embodiments of the conveyor systems and the methods of controlling a moving stage, are intended for the purposes of illustration only and are not intended to limit the scope of the invention.

Figure 1:
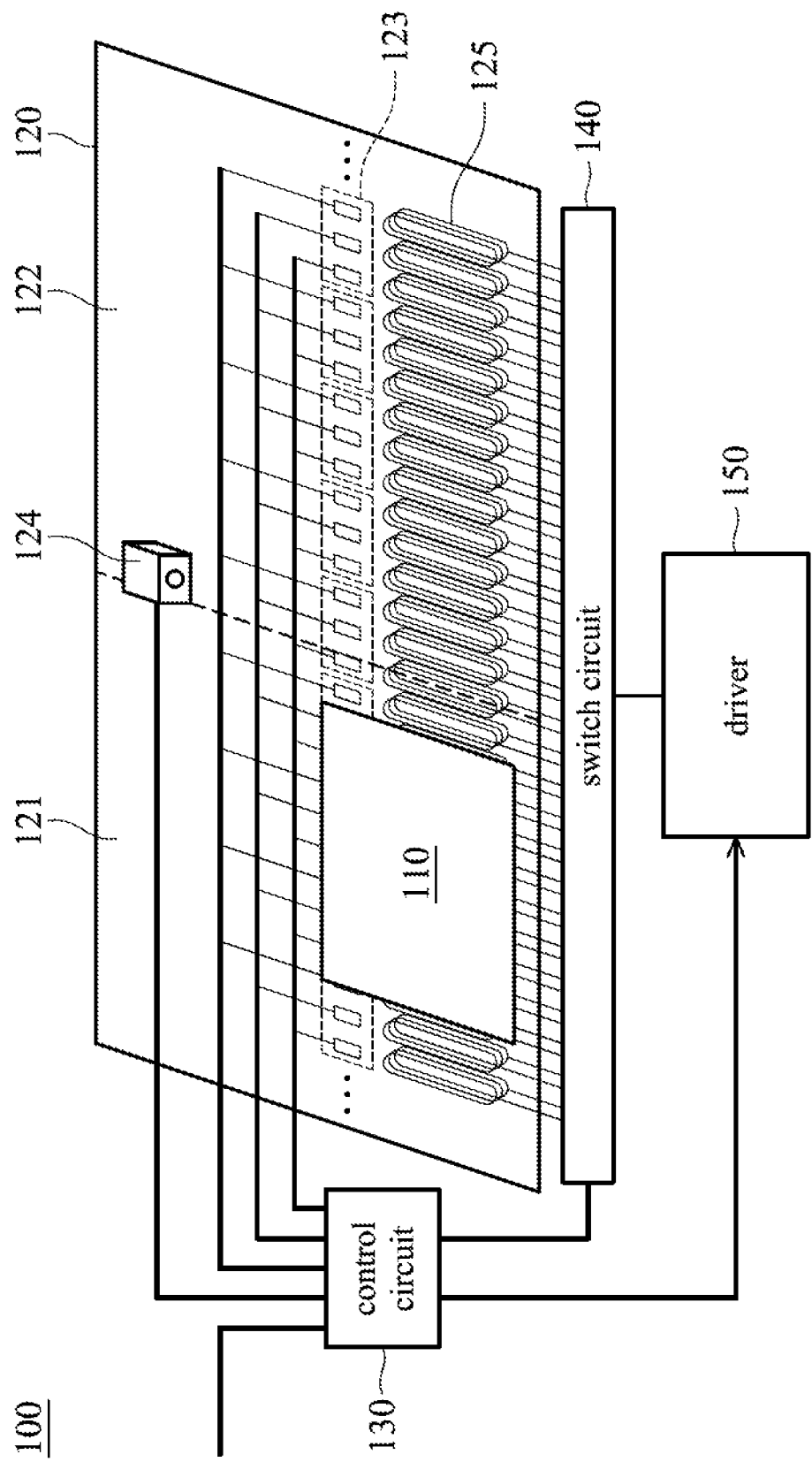
FIG. 1 is a schematic diagram of a conveyor system in accordance with an embodiment of the present invention.
Figure 2:
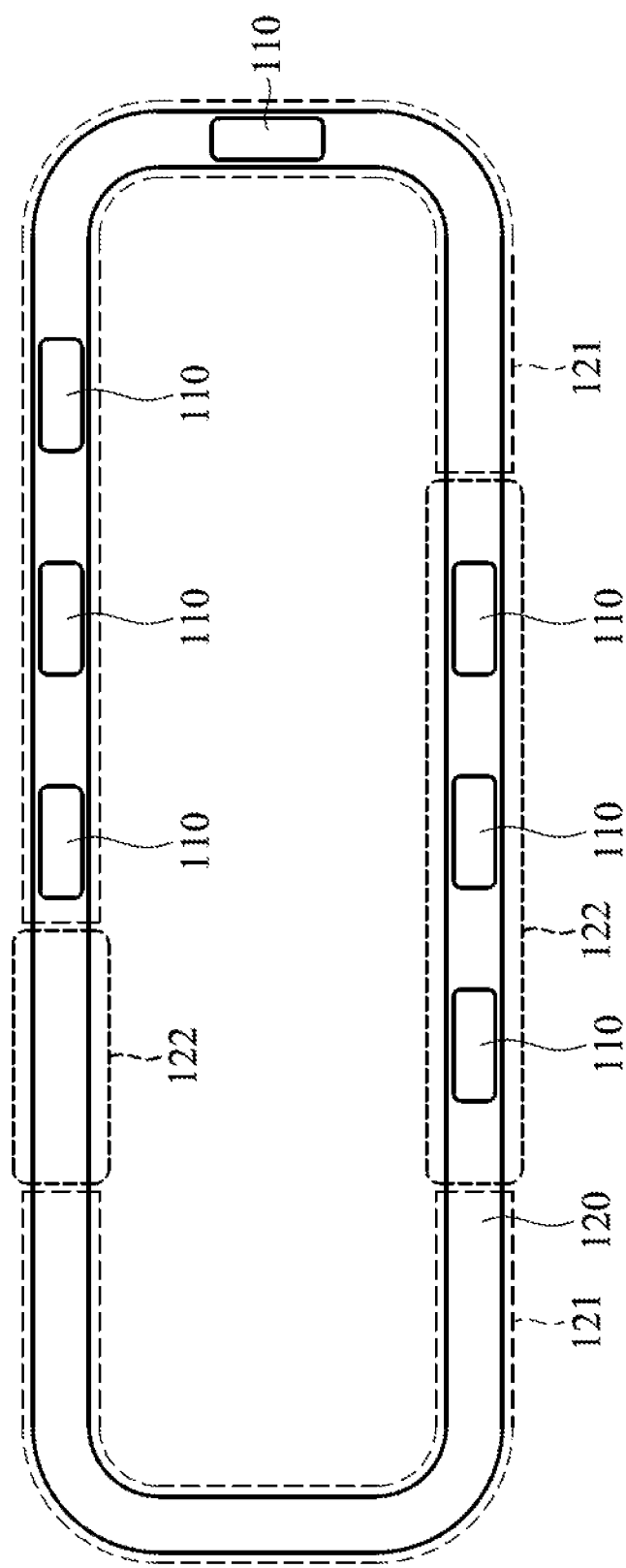
FIG. 2 is a schematic diagram of a track configuration in accordance with an embodiment of the present invention.

FIG. 1 is a schematic diagram of a conveyor system in accordance with an embodiment of the present invention. The conveyor system 100 includes an at least one moving stage 110, a track 120, a control circuit 130, a switch circuit 140, and a driver 150. The moving stage 110 moves along the track 120, and is provided with a plurality of permanent magnets and an optical scale (or magnetic scale). The magnets of the moving stage 110 are arranged in parallel along the moving direction of the moving stage 110, and set in the way that the S poles and the N poles of the magnets are alternately arranged. The track 120 is provided with a plurality of coil windings 125 which are formed by winding a core with the coil, and the coil windings 125 are arranged along the moving direction of the moving stage 110. The coil windings 125 correspond to the permanent magnets of the moving stage 110. FIG. 2 is a schematic diagram of a track configuration in accordance with an embodiment of the present invention. In this embodiment, the track 120 may include a first work area 121 and a second work area 122 for performing different processing operations on the moving stage 110. For example, the first work area 121 is used to perform a general machining process, and a second work area 122 is used to perform a precision machining process. It should be noted that although this embodiment includes two first work areas 121 and two second work areas 122, the number of first work area 121 and the second work area 122 may be adjusted according to processing requirements, and it is not limited thereto. The first work area 121 is provided with a plurality of sets of Hall sensor modules 123, and the second work area 122 is provided with the plurality of sets of Hall sensor modules 123 and a read head module. According to an embodiment of the present invention, the sensing accuracy of the Hall sensor is about 10 to 100 μm, and the accuracy of the optical scale is about 0.1 to 9 μm. In addition, it should be noted that a length of the second work area 122 must be greater than the distance between the two adjacent Hall sensor modules 123 to prevent that the control circuit 130 cannot determine an accurate position of the moving stage 110 via the Hall sensor modules 123 when the moving stage 110 enters the second work area 122. The length of the work area represents a distance of performing a complete machining process. Each Hall sensor module 123 composes of three Hall sensors, and the phase difference between two adjacent Hall sensors is 120 degrees. When the moving stage 110 passes through the Hall sensor module 123, the Hall sensor module 123 outputs a first sense signal to the control circuit 130 according to a magnetic field change, and the control circuit 130 determines the position of the moving stage 110 according to an interpolation of the first sensing signals having different phases. FIG. The read head module 124 is disposed at a start position of the second work area 122 for sensing the optical scale disposed on the moving stage 110, and outputs a second sensing signal to the control circuit 130 when sensing the optical scale. The control circuit 130 connects to each Hall sensor module 123 and each read head module 124 via a wired manner to receive the sensing signal. After receiving the first sensing signal and/or the second sensing signal, the control circuit 130 determines the position of the moving stage 110 according to the first sensing signal and the second sensing signal, and further calculates a moving direction and a moving speed of the moving stage 110 to control the coil winding 125 of the switch circuit 140. The driver 150 is used to energize the coil winding 125 such that attraction will be generated between the coil winding 125 and the permanent magnets of the moving stage 110 to move the stage 110 along the track 120.

It should be noted that the number of rows of the Hall sensor module 123, the number of processing procedures of the control circuit 130, and the number of switch circuits 140 and drivers 150 are related to the number of moving stages 110. For example, when there is one moving stage 110, the Hall sensor module 123 has three rows, the control circuit 130 only needs to execute one processing procedure, and the number of switch circuits 140 and drivers 150 is one. However, when there are two moving stages 110, the Hall sensor module 123 has six rows, the control circuit 130 must execute two processing programs, and the number of switch circuits 140 and drivers 150 increases to two, and so on.

According to an embodiment of the present invention, the number of read heads in the read head module 124 can be determined by the number of moving stages 110 to be processed in the second work area 122 simultaneously or the length of the second work area 122. For example, when only a single moving stage 110 is processed in the second processing area 122 or the length of the second work area 122 is about the length of the moving stage 110, the read head module in the work area 122 can be provided with only one read head 124. In another example, as shown in FIG. 3A, the moving direction of the moving carriage 110 is from left to right (shown as an arrow), and the read head 124 is provided at the starting position of the second work area 320, i.e., at a position where the stage 110 enters the second work area 320. When the read head 124 detects the optical scale, i.e., the point I passes through the read head 124, the read head 124 starts outputting and accumulating the signals corresponding to the tracks A and B of the optical scale to generate the second sensing signal as shown in FIG. 3B, such that the control circuit 130 can accurately position the moving stage 110 according to the accumulated value. It should be noted that the signal corresponding to the incremental optical scale as shown in FIG. 3B is only an embodiment of the present invention, and the optical scale can be another type of optical ruler, such as an absolute optical scale, for example, but it is not limited thereto.

Figure 4A:
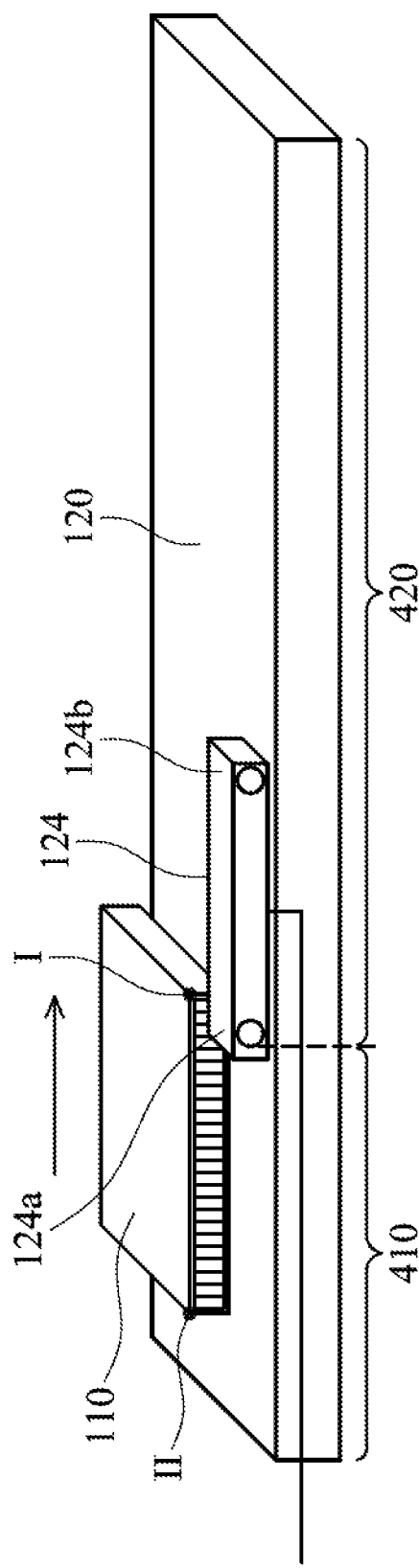
FIGS. 4A and 4B are schematic diagrams of a head module having at least two read heads in accordance with an embodiment of the present invention.
Figure 4B:
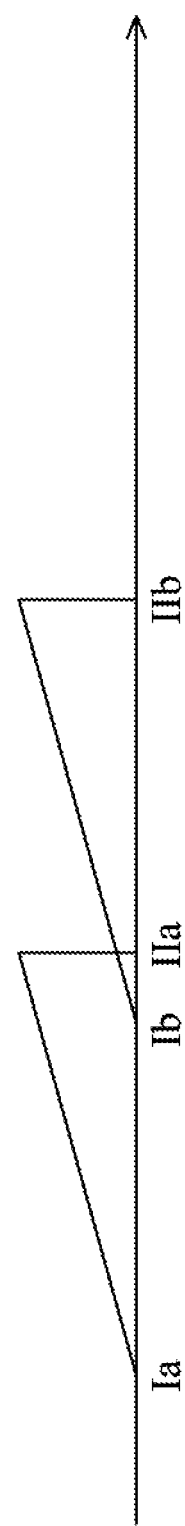

In accordance with another embodiment of the present invention, when two or more moving stages 110 are processed in the second work area 122 simultaneously and the length of the second work area 122 is greater than the length of the moving stage 110, the read head module in the second work area 122 requires two or more read heads to accurately determine the respective position of each moving stage 110. For example, as shown in FIG. 4A, the moving direction of the moving carriage 110 is from left to right (shown by the arrow), and the read head 124a is provided at the starting position of the second work area 420, i.e., at a position where the moving stage 110 enters the second work area 420, and the read head 124b is disposed a predetermined distance from the read head 124a. The predetermined distance is less than the length of the moving stage 110, and the spacing between each read head is the same. When the read head 124a detects the optical scale, i.e., the point I passes through the read head 124, the read head 124 starts outputting and accumulating the signals corresponding to the two tracks A and B of the optical scale to generate a second sensing signal as shown in FIG. 4B. As shown in FIG. 4B, when the read head 124b detects the optical scale, an overlapping area will be produced since the distance between the two read heads is less than the length of the moving stage 110, i.e., an area between Ib and IIa, such that the control circuit 130 can accurately position the moving stage 110 in the second work area 122 via the read head module 124. In addition, when two or more moving stages 110 are processed in the second work area 320 simultaneously, the control circuit 130 can enable the switch circuit 140 and the driver 150 to make another moving stage moving into the second work area 320 after the control circuit 130 determines that the point II passes through the read head 124a to improve efficiency of the production line.

Figure 5A:
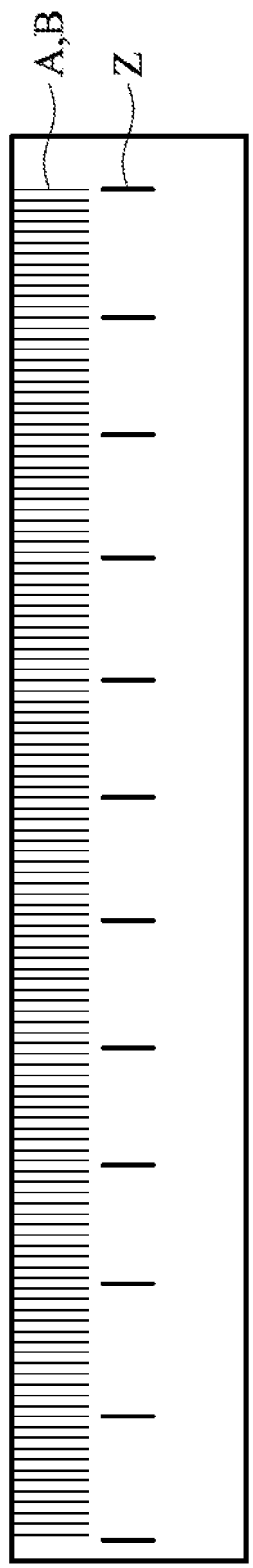
FIGS. 5A, 5B are schematic diagrams of an optical scale in accordance with some embodiments of the present invention.
Figure 5B:
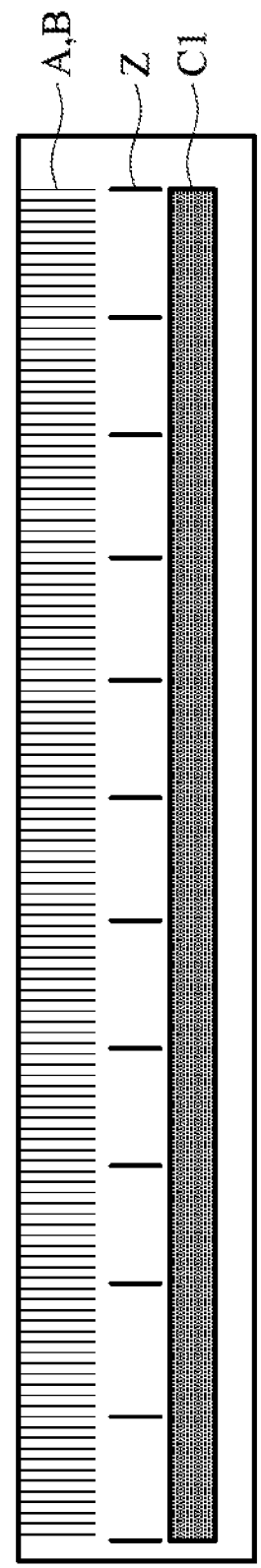

FIGS. 5A, 5B are schematic diagrams of the optical scale in accordance with some embodiments of the present invention. As shown in FIG. 5A, when the optical scale is an incremental optical scale, the optical scale includes tracks "A", "B", which are sensed by two light sensors A, B to indicate the spacing between the two sensing elements, and the track "Z" representing an origin index. The origin index is used to indicate the entry of the optical scale. In addition, as shown in FIG. 5B, the optical scale may include another track "C1" for representing a coding pattern corresponding to each moving stage, such that when there are a plurality of moving stages moving in the conveyor system, the control circuit 130 can accurately track the exact locations corresponding to each moving stage more.

It should be noted that the number of sensors in the read head is the same as the number of traces. For example, as shown in FIG. 5A, when the optical scale has two tracks, the number of sensors in the head is two. Furthermore, as shown in FIG. 5B, when the optical scale has three tracks, the number of sensors in the head is three.

Figure 6:
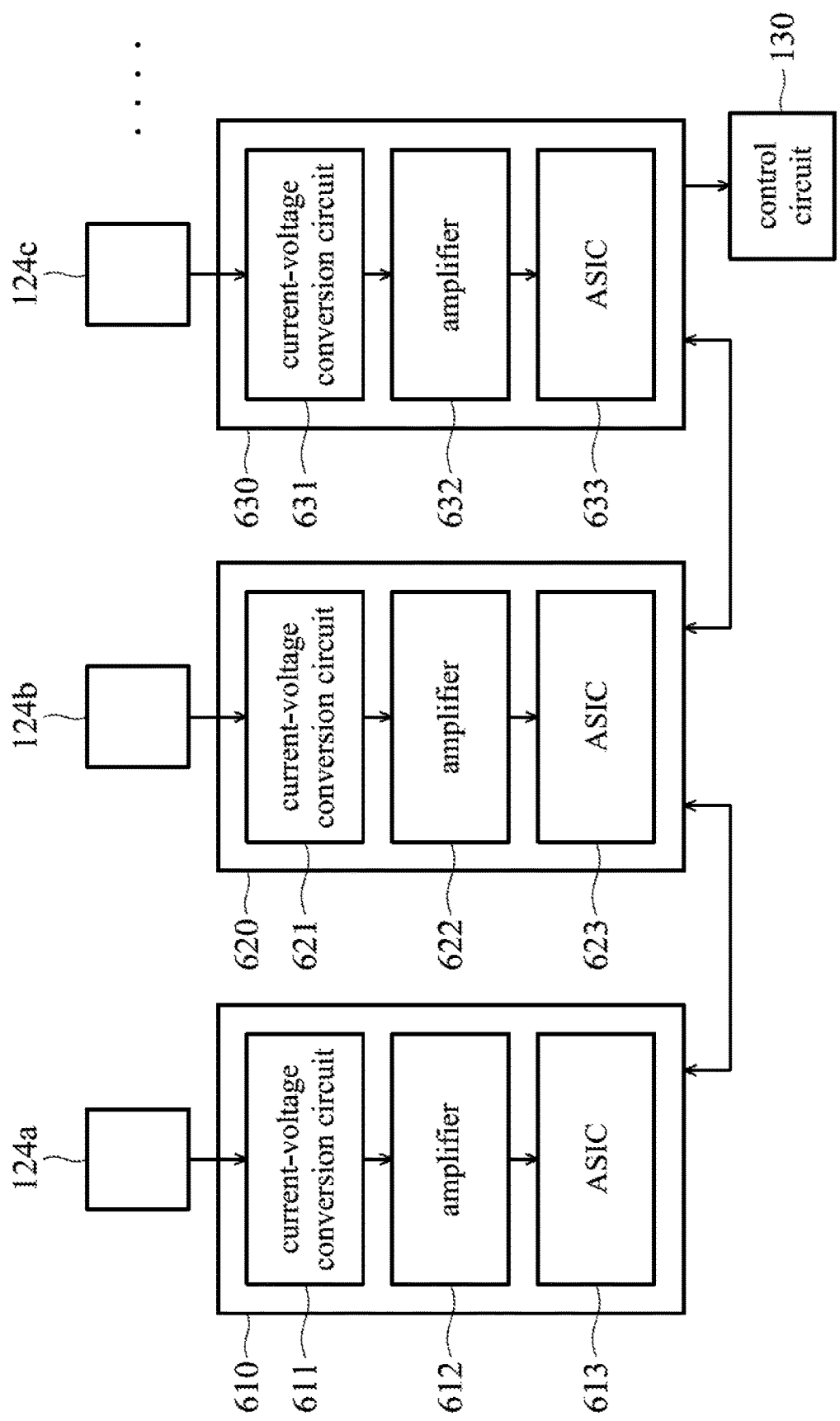
FIG. 6 is a schematic diagram of an internal circuit of the read head module in accordance with an embodiment of the present invention.

Please refer to FIG. 6, FIG. 6 is a schematic diagram of an internal circuit of a read head module in accordance with an embodiment of the present invention. As shown in FIG. 6, the internal circuit 610 corresponding to the read head module 124a includes a current-voltage conversion circuit 611, an amplifier 612, and an application-specific integrated circuit (ASIC) 613. The application-specific integrated circuit of each read head is capable of communicating with each other, and the sensing signal output from each application-specific integrated circuit includes a specific identification signal representing itself, and the control circuit 130 recognizes the read head according to the output identification signal.

Figure 7:
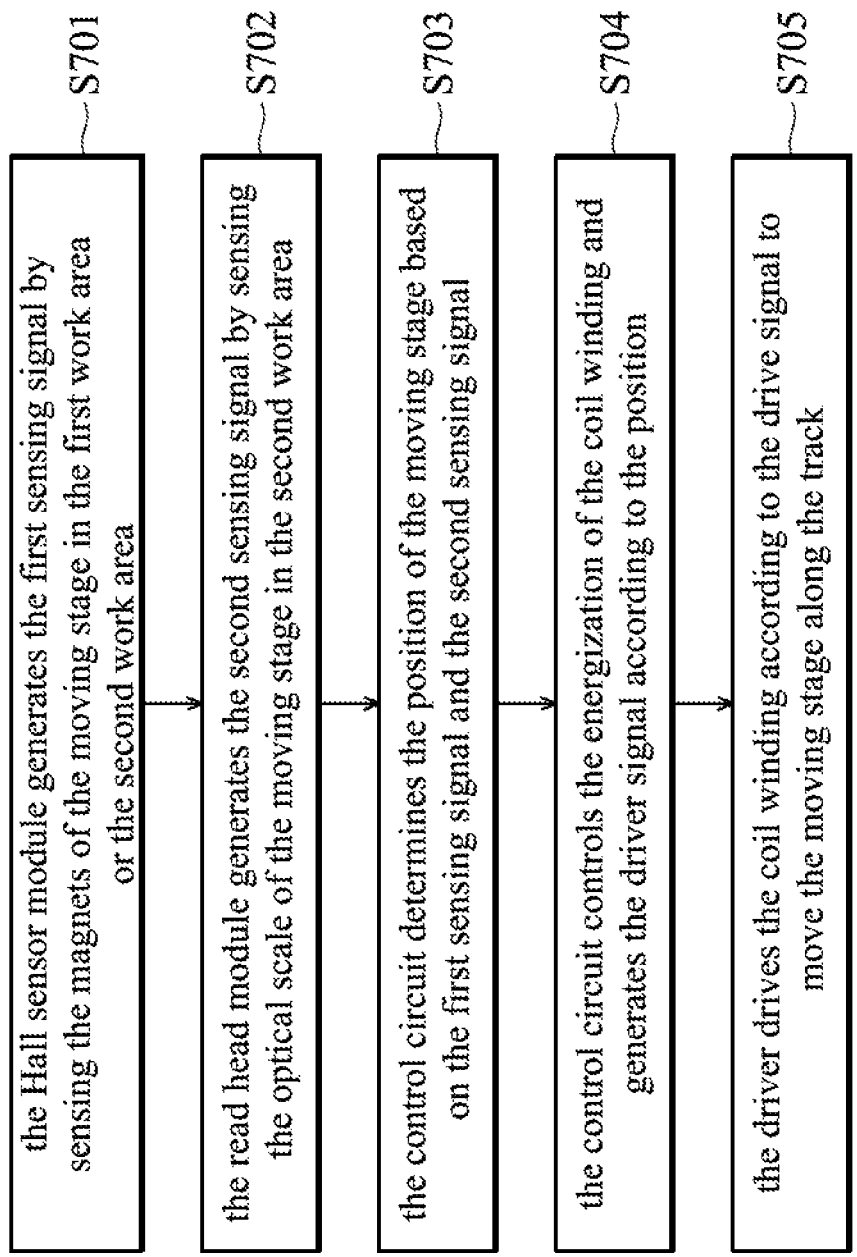
FIG. 7 is a flowchart of a method of controlling a moving stage in accordance with an embodiment of the present invention.

FIG. 7 is a flowchart of a method of controlling a moving stage in accordance with an embodiment of the present invention. In step S701, the Hall sensor module generates a first sensing signal by sensing the magnets of the moving stage in the first work area or the second work area. In step S702, the read head module generates the second sensing signal by sensing the optical scale of the moving stage in the second work area. In step S703, the control circuit determines the position of the moving stage based on the first sensing signal and the second sensing signal. In step S704, the control circuit controls the energization of the coil winding and generates the driver signal according to the position. In step S705, the driver drives the coil winding according to the drive signal to move the moving stage along the track.

As described above, according to the conveyor system and the method of controlling a moving stage of the present invention, since there are only magnets and the optical scale provided on the moving stage, the moving stage does not require any wires, e.g., signal lines, power lines, etc., meaning that the movement of the moving stage on the track will not be limited by a wire, and there is also no wire winding problems. Furthermore, when the conveyor system is reconfigured, the user only needs to change the configuration of stators rather than changing the wiring of the moving stage. In addition, through the planning of the precision machining area and non-precision machining area, the movement accuracy of the moving stage can be improved, such that the products can be machined directly on the track without moving to an additional work area, thereby manufacturing costs can be reduced and performance of the production line can also be improved.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A conveyor system, comprising:
a moving stage, provided with a plurality of magnets and an optical scale;
a track, having a plurality of coil windings, and carrying the moving stage, wherein the track further comprises:
a first work area, provided with a plurality of sets of Hall sensor modules; and
a second work area, provided with Hall sensor modules and a read head module;
wherein when the moving stage is in the first work area, the Hall sensor module generates a first sensing signal by sensing the magnets; and
wherein when the moving stage is in the second work area, the Hall sensor module generates the first sensing signal by sensing the magnets and the read head module generates a second sensing signal by sensing the optical scale;
a control circuit, determining a position of the moving stage according to the first sensing signal and the second sensing signal, controlling energization of the coil windings and generating a driving signal according to the position; and
a driver, driving the coil windings according to the driving signal.

2. The conveyor system as claimed in claim 1, wherein the Hall sensor modules are arranged equidistantly along a moving direction of the moving stages, each of the Hall sensor modules consists of three Hall sensors, and there is a phase difference between two of the Hall sensors of 120 degrees.

3. The conveyor system as claimed in claim 1, wherein the second work area has a length that is greater than a distance between two of the Hall sensor modules.

4. The conveyor system as claimed in claim 1, wherein when the length of the second work area is less than a length of the moving stage, the read head module has only one read head, and the read head is arranged at a starting position of the second work area.

5. The conveyor system as claimed in claim 1, wherein when the length of the second work area is greater than or equal to a length of the moving stage, the read head module has at least two read heads, and the read heads are arranged equidistantly along the moving direction of the moving stages from a starting position of the second work area.

6. The conveyor system as claimed in claim 1, wherein the optical scale has a first track and a second track, the first track consists of a sensing element pitch, and the second track is a coding pattern corresponding to the optical scale.

7. The conveyor system as claimed in claim 1, wherein the sensing accuracy of the first work area is 10 to 100 μm, and the sensing accuracy of the second work area is 0.1 to 9 μm.

8. A method of controlling a moving stage, adapted to a conveyor system having at least one moving stage, a track, a control circuit and a driver, wherein the moving stage is provided with a plurality of magnets and an optical scale, comprising:
generating, using one of the Hall sensor modules, a first sensing signal by sensing the magnets when the moving stage is in a first work area of the track;
generating, using the Hall sensor modules, the first sensing signal by sensing the magnets, and generating, with a read head module, a second sensing signal by sensing the optical scale when the moving stage is in a second work area of the track;
determining, by using a control circuit, the position of the moving stage according to the first sensing signal and the second sensing signal;
generating, with the control circuit, a driving signal according to the position; and
driving, via a driver, the coil windings provided on the track according to the driving signal for carrying the moving stage.

9. The method as claimed in claim 8, wherein the Hall sensor modules are arranged equidistantly along the moving direction of the moving stages, each of the Hall sensor modules consists of three Hall sensors, and the phase difference between two of the Hall sensors is 120 degrees.

10. The method as claimed in claim 8, wherein the length of the second work area is greater than the distance between two of the Hall sensor modules.

11. The method as claimed in claim 8, wherein when the length of the second work area is less than the length of the moving stage, the read head module has only one read head, and the read head is arranged at the starting position of the second work area.

12. The method as claimed in claim 8, wherein when the length of the second work area is greater than or equal to the length of the moving stage, the read head module has at least two read heads, and the read heads are arranged equidistantly along the moving direction of the moving stages from the starting position of the second work area.

13. The method as claimed in claim 8, wherein the optical scale has a first track and a second track, the first track consists of a sensing element pitch, and the second track is a coding pattern corresponding to the optical scale.

14. The method as claimed in claim 8, wherein the sensing accuracy of the first work area is 10 to 100 μm, and the sensing accuracy of the second work area is 0.1 to 9 μm.

* * * * *